US008503792B2

(12) United States Patent
Zhang et al.

(10) Patent No.: US 8,503,792 B2
(45) Date of Patent: Aug. 6, 2013

(54) PATCH DESCRIPTION AND MODELING FOR IMAGE SUBSCENE RECOGNITION

(75) Inventors: Ximin Zhang, San Jose, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 12/972,162

(22) Filed: Dec. 17, 2010

(65) Prior Publication Data

US 2012/0155766 A1 Jun. 21, 2012

(51) Int. Cl.
*G06K 9/46* (2006.01)
*G06K 9/62* (2006.01)
*G06K 9/00* (2006.01)
*G06K 9/48* (2006.01)

(52) U.S. Cl.
USPC ........... 382/195; 382/159; 382/165; 382/197; 382/224

(58) Field of Classification Search
None
See application file for complete search history.

(56) References Cited

U.S. PATENT DOCUMENTS

| | | | |
|---|---|---|---|
| 6,584,221 | B1 | 6/2003 | Moghaddam et al. |
| 7,734,064 | B2 | 6/2010 | Chang et al. |
| 2002/0136449 | A1 | 9/2002 | Park et al. |
| 2006/0050783 | A1* | 3/2006 | Le Dinh et al. ............ 375/240.2 |
| 2009/0263023 | A1* | 10/2009 | Iwamoto ...................... 382/199 |
| 2010/0098342 | A1 | 4/2010 | Davis et al. |
| 2012/0128237 | A1* | 5/2012 | Wang et al. .................. 382/159 |

OTHER PUBLICATIONS

Belongie et al, "Color- and Texture-Based Image Segmentation Using EM and Its Application to Content-Based Image Retrieval," 1998, Sixth International Conference on Computer Vision, Div. of Comput. Sci., California Univ., Berkeley, pp. 675-682.*
Belongie, S. et al.—"Color- and Texture-Based Image Segmentation Using EM and Its Application to Content-Based Image Retrieval"—6th Int. Conf. on Computer Vision, Jan. 4-7, 1998, Bombay, India, pp. 675-682.
Permuter, H. et al—"Gaussian Mixture Models of Texture and Colour for Image Database Retrieval"—Proc. IEEE Int. Conf. on Acoustics, Speech, and Signal Processing, Apr. 6-10, 2003, vol. 3, pp. 569-572.
Permuter, H. et al.—"Supervised Joint Segmentation and Classification of Colored Textured Images Using Gaussian Mixture Models"—MOUMIR Multimedia Content Retrieval Conf., Mar. 11-12, London, England, pp. 1-26.

* cited by examiner

*Primary Examiner* — Bhavesh Mehta
*Assistant Examiner* — David F Dunphy
(74) *Attorney, Agent, or Firm* — John P. O'Banion (57) ABSTRACT

A method and apparatus is described that categorizes images by extracting regions and describing the regions with a set of 15-dimensional image patch feature vectors, which are concatenations of color and texture feature vectors. By comparing the image patch feature vectors in images with similarly-obtained image patch vectors in a Gaussian mixture based model pool (obtained in an image patch modeling phase), the images may be categorized (in an image patch recognition phase) with probabilities relating to each image patch. Higher probabilities are likelier correlations. The device may be a single or multiple core CPU, or parallelized vector processor for characterizing many images. The images may be photographs, videos, or video stills, without restriction. When used real-time, the method may be used for visual searching or sorting.

22 Claims, 7 Drawing Sheets

PATCH DESCRIPTION AND MODELING FOR IMAGE SUBSCENE RECOGNITION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image classification, and more particularly to image classification using subscene characterization. This invention relates to an apparatus and method for processing pictures, more particularly, to an apparatus and method for intrinsic image patch feature extraction and subscene recognition.

2. Description of Related Art

Image classification and object detection been investigated for many years. Image classification approaches have ranged from image retrieval by using color histogram in 1990s, to image matching using Scale-Invariant Feature Transform (or SIFT). However, currently available techniques still remain far away from customer expectations of non-expert image classification and object detection. Except for a few very well defined problems, such as face recognition, the problem of general image classification and object detection remains largely unsolved.

BRIEF SUMMARY OF THE INVENTION

An aspect of the invention is an image classification apparatus, comprising: a computer; and means for patch classifying an input image using the computer.

The means for patch classifying may comprise subscene modeling; and performing subscene recognition.

The subscene modeling step may comprise programming for executing steps further comprising: segmenting an input image training set from an image database into one or more segmented regions based on an input pool of N subscene categories; extracting a set of training patch feature vectors for each of the segmented regions corresponding to the input pool of N subscene categories; and forming a subscene model pool comprising training patch feature vectors for each for the input pool of N subscene categories.

The computer may be capable of executing the means for patch classifying either sequentially or at least partially in parallel.

The performing subscene recognition step may comprise: segmenting the input image into a set of input regions; extracting patch features corresponding to each of the set of input regions to form a set of extracted patch feature vectors; and filtering the set of extracted patch features against the subscene model pool to form a filtered output.

The performing subscene recognition step may further comprise: selecting the set of extracted patch features corresponding to one or more of the largest filtered outputs.

The image classification apparatus above may further comprise: setting a subscene to one of the group consisting of: the training patch feature vectors and the set of extracted patch feature vectors; and dividing the subscene into a set of image patches, describing each image patch by a set of concatenated image patch feature vectors $\vec{V}_{image\_patch}$ comprising: a color feature vector $\vec{V}_{color}$; and a texture feature vector $\vec{V}_{texture}$; wherein the subscene is in a YCbCr color space with a luminance Y channel, a blue chrominance Cb channel, and a red chrominance Cr channel.

The color feature vector $\vec{V}_{color}$ may be calculated for each image patch in the subscene using steps comprising: calculating a mean value $\overline{Y}$ of the luminance Y channel and mean values $\overline{Cb}$ and red $\overline{Cr}$ respectively for both the blue Cb and red Cr chrominance channels. The color feature vector $\vec{V}_{color}$ may be calculated for each image patch using steps further comprising: calculating a two dimensional (2D) chrominance histogram of both the blue Cb and red Cr chrominance channels; wherein the histogram comprises bins.

The color feature vector $\vec{V}_{color}$ may be calculated in the patch using steps comprising: calculating an patch luminance variance as:

$$\mathrm{Var}(Y) = \frac{1}{N}\sum_{i=1}^{N}(Y_i - \overline{Y})^2;$$

and calculating a patch chrominance variance as:

$$\mathrm{Var}(CbCr) = \frac{1}{N}\left(\sum_{i=1}^{N}(Cb_i - \overline{Cb})^2 + (Cr_i - \overline{Cr})^2\right)$$

where N denotes a number of pixels in the patch, $Y_i$, $Cb_i$, and $Cr_i$ denote a pixel value in position i in the image patch in each of the luminance Y channel, the blue Cb, and the red Cr chrominance channels, $\overline{Y}$ represents the mean value of Y, $\overline{Cb}$ represents the mean value of Cb, and $\overline{Cr}$ represents the mean value of Cr.

The color feature vector $\vec{V}_{color}$ may be calculated in the image patch using steps further comprising: calculating a colorfulness value as Colorfulness=$|\overline{Cb}-\overline{Cr}|$.

The color feature vector $\vec{V}_{color}$ may be calculated for the image patch using steps further comprising: forming a 6-dimensional (6D) color feature vector ($\vec{V}_{color}$) as $\vec{V}_{color}$=($\overline{Y}$, $\overline{Cb}$, $\overline{Cr}$, Var(Y), Var(CbCr), Colorfulness).

The texture feature vector $\vec{V}_{texture}$ may be calculated for each image patch in the subscene using steps comprising: performing an edge detection procedure on the luminance channel (Y domain) to generate a set of edge points; categorizing each edge point into one of nine classes according to their gradient directions, which are rounded to integer degrees into one of nine directions selected from the group of directions consisting of: $D_0$ (−10° to +10°), $D_1$ (11° to 30°), $D_2$ (31° to 50°), $D_3$ (51° to 70°), $D_4$ (71° to 90°), $D_5$ (91° to 110°), $D_6$ (111° to 130°), $D_7$ (131° to 150°), and $D_8$ (151° to 170°).

The texture feature vector $\vec{V}_{texture}$ may be calculated for each image patch using steps further comprising: for each image patch $$D_U = \sum_{Direction(Edge(i,j))=U} \|Edge(i,j)\|$$

where U is the direction index, $U \in (D_0, D_1, D_2, D_3, D_4, D_5, D_6, D_7, D_8)$, (i, j) denotes the point position within the range of the image patch, and ∥Edge (i,j)∥ denotes the edge strength (amplitude of the gradient).

The texture feature vector $\vec{V}_{texture}$ may be calculated using steps comprising: forming a concatenated 9-dimensional (9D) texture feature vector ($\vec{V}_{texture}$), wherein $\vec{V}_{texture} = (D_0, D_1, D_2, D_3, D_4, D_5, D_6, D_7, D_8)$.

Each of the image patch feature vectors $\vec{V}_{image\_patch}$ may be calculated using steps comprising: forming a concatenated 15-dimensional (15D) texture feature vector $\vec{V}_{image\_patch}$, wherein $\vec{V}_{image\_patch} = (\vec{V}_{color}, \vec{V}_{texture})$ wherein $\vec{V}_{image\_patch}$ written in detail comprises:

$$\vec{V}_{image\_patch} = \begin{pmatrix} \overline{Y}, \overline{Cb}, \overline{Cr}, Var(Y), Var(CbCr), Colorfulness, \\ D_0, D_1, D_2, D_3, D_4, D_5, D_6, D_7, D_8 \end{pmatrix}.$$

In the image classification apparatus above, the subscene modeling step may comprise a means for selecting an optimal number of clusters in the step of forming the subscene model pool.

The means for patch classifying above may be stored on a computer readable medium.

In the image classification apparatus above, the performing subscene recognition step may be performed on a set of photographs.

In another aspect of the invention, an image classification apparatus may comprise: a computer; and a program executable on the computer for patch classifying an input; wherein said patch classifying comprises: performing subscene recognition; and steps for performing subscene modeling; wherein said steps for performing subscene modeling comprises: segmenting an input image training set from an image database into one or more segmented regions based on an input pool of N subscene categories; extracting a set of training patch feature vectors for each of the segmented regions corresponding to the input pool of N subscene categories; and forming a subscene model pool comprising training patch feature vectors for each for the input pool of N subscene categories.

The program executable above may be stored on a computer readable medium as a program in either source code or object code.

In another aspect of the invention, an image classification apparatus may comprise: a computer; and a programming executable on the computer for performing one or more steps comprising patch classifying an input image; wherein the patch classifying comprises programming for executing steps comprising: subscene modeling; and performing subscene recognition. A computer readable medium may be used for storing the programming executable above.

The subscene modeling step may comprise means for selecting an optimal number of clusters in the step of forming the subscene model pool.

Another aspect of the invention is the image classification above, wherein the means for patch classifying are stored on a computer readable memory.

A still further aspect of the invention is the image classification apparatus above, wherein the performing subscene recognition step is performed on a set of photographs.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

A. Introduction

With increased computational hardware now available, it becomes possible to create processes that were previously inconceivable. More and more intelligent features that emulate human capabilities are desirable for new products, thereby improving and easing human-machine interactions.

In automobiles, for instance, people would like automatic detection of people behind or in front of the car to prevent accidents. Users would also like a camera or video recorder to automatically determine an optimal setup given ambient environmental conditions to take the best possible photographs and videos. In computers, users would also want their computers to automatically categorize personal or business photo collections. For video recordings, users would be intrigued with a camcorder that could automatically remove meaningless scenes and compile an attractive video clip. All of the foregoing applications, and many other related applications, cannot be realized without accurate image classification and object detection.

Since image classification and object detection is an area of great interest in both research and application, it has been investigated for many years. Many image classification approaches have been proposed, ranging from image retrieval by using color histogram in 1990s, to image matching using Scale-Invariant Feature Transform (or SIFT), which is an algorithm in computer vision used to detect and describe local features in images. However, extant techniques remain still far away from customer expectations of non-expert image classification and object detection. Except for a few very well defined problems, such as face recognition, the problem of general image classification and object detection remains largely unsolved.

Scene recognition and representation is an important branch in general image classification and object detection. Good scene recognition and representation techniques can greatly improve the performance of many computer vision applications, such as image categorization (natural grouping of images instead of clusters based on time or simple text descriptions), image retrieval (used to find images in archives based on visual similarity). It can also provide contextual information to improve the object recognition. For instance, if we know the scene represents a city street, then the probability of a vehicle will be much higher than a ship.

Currently, one to many words are typically used to describe a given scene. However, such annotations often lead to very different scenes having the same description. To address this problem here, an image is described with a set of meaningful regions or objects with certain spatial relationships. In this invention, the term "subscene" is used to represent a meaningful region or object within an image or video scene.

The aim here is to detect and classify each subscene within an image, and then to represent the subscene with a semantic label of low complexity without any human intervention. To do so, a patch color extraction scheme is developed to extract the patch color features; and a patch texture extraction scheme is developed to extract the patch texture features. By combining these features a multi-dimensional feature vector is generated for each patch. Then a Gaussian mixture model is used to represent the subscene with the feature vector as the variable.

The parameters of the Gaussian mixture model are obtained by using an Expectation Maximization (EM) algorithm on all of the training data selected from an image database set. After the models for each subscene feature category are obtained, the subscene classification is done by voting on each of the subscene categories. The model with the maximum output is selected as the best description.

B. Overall Method Description

Figure 1A:
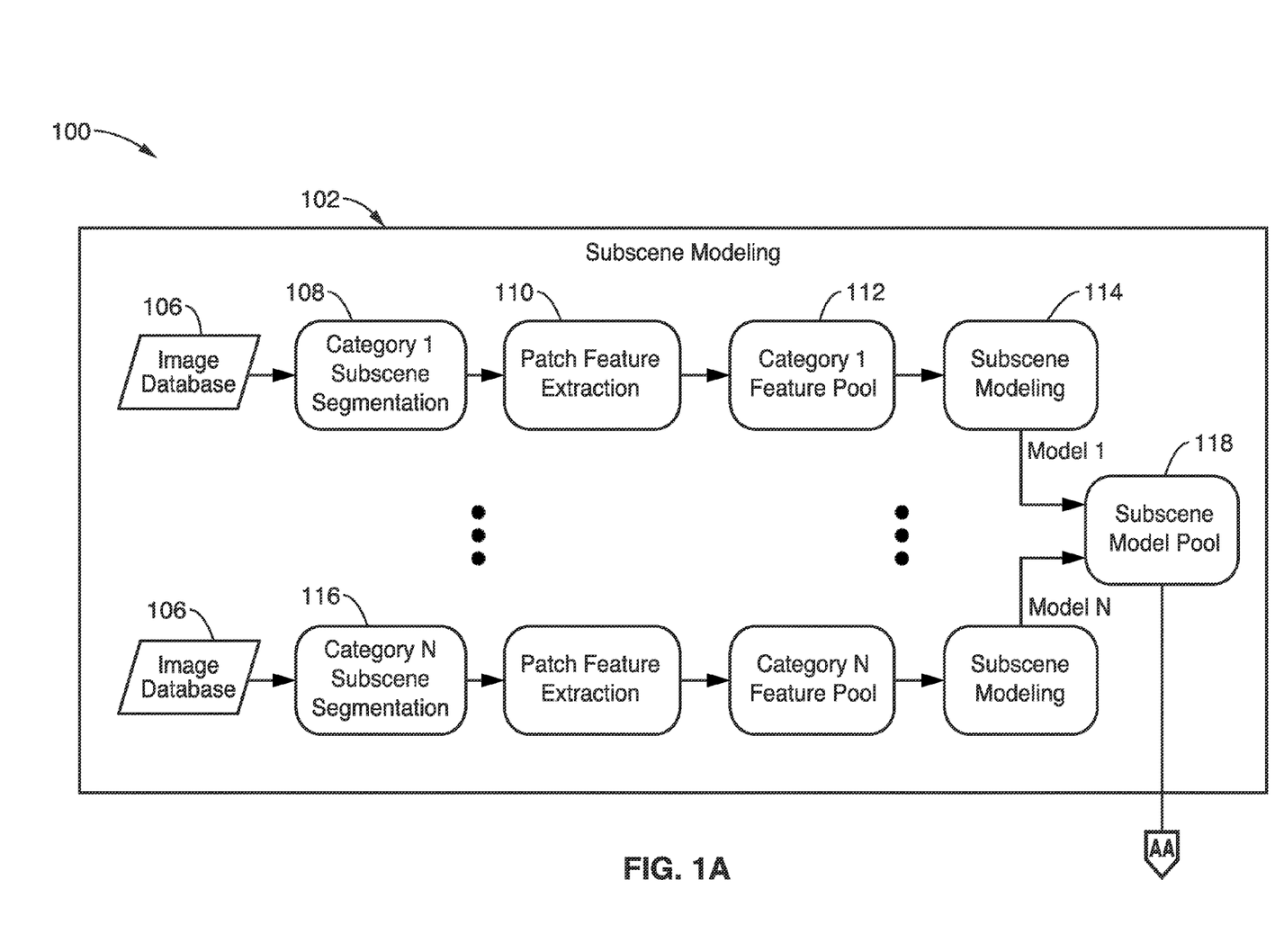
FIG. 1 is a flow chart of an overall method of patch subscene modeling and recognition.
Figure 1B:
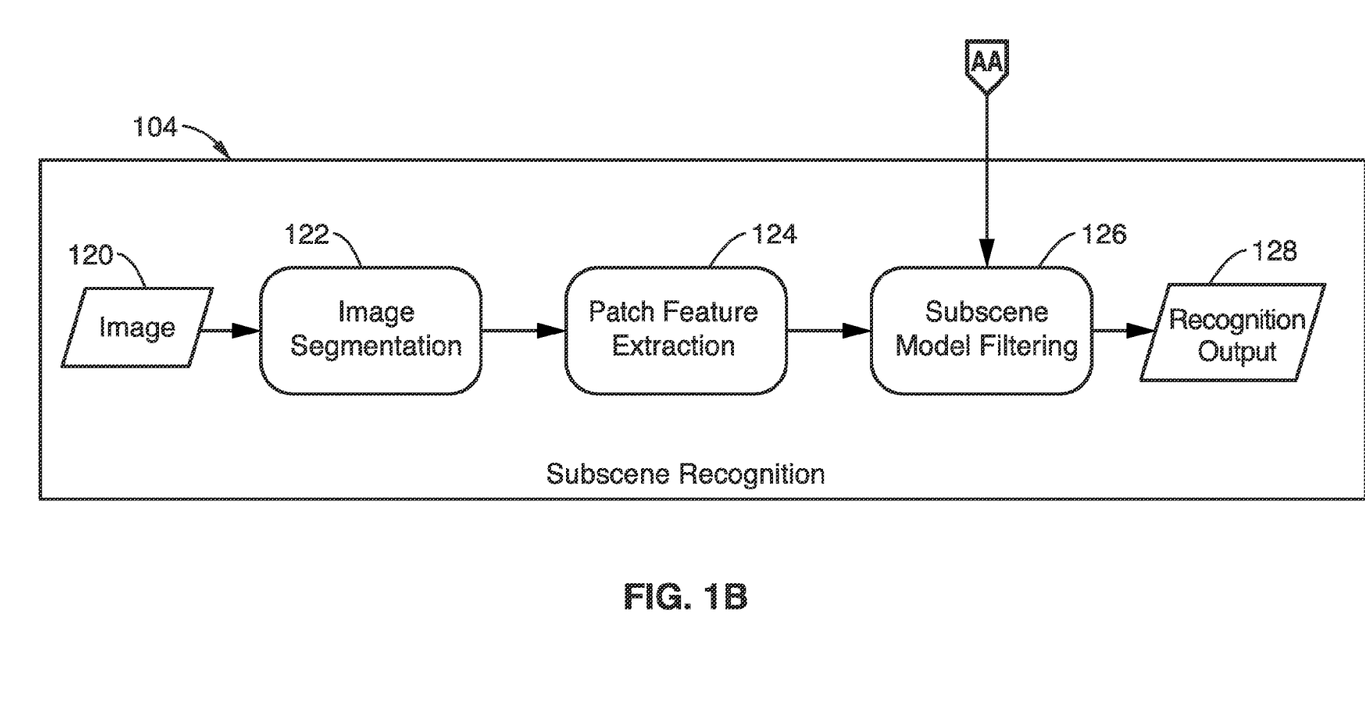

Refer now to FIGS. 1A and 1B, which form a flowchart of the overall architecture of the method 100. It consists of two sections: a subscene modeling section 102 and a subscene recognition section 104. In the subscene modeling section 102, the subscene representation model is obtained by the following procedure:

1. In the first step, the images comprising an image database 106 are first segmented 108 based on subscene categories to form subscenes. As an example, without limitation, if category 1 subscene represents a mountain, then the mountain within each image is segmented out as an independent subscene.

2. Each subscene is divided into a set of fixed size image patches, and the patch features are correspondingly extracted into one or more patch feature vectors 110 respectively.

3. After all the input mountain subscenes in the image database 106 are processed, the extracted features are stored in the Category 1 feature pool 112.

4. Then, features in the pool are used to learn a patch representation of the subscene model in the module Subscene Modeling 114.

5. Steps 1 to 4 are repeated until all the subscene models from category 1 through category N 116 are obtained. These individual N models are then stored in a subscene model pool 118.

Now in the subscene recognition section 104 of FIG. 1B, subscene recognition is conducted as follows:

1. An input image 120 is first segmented 122 into a set of subscenes.

2. Each subscene is divided into a set of fixed size image patches, from which the patch features are correspondingly extracted 124.

3. The extracted patch feature 124 is filtered 126 by all the subscene models present in the subscene model pool 118 in module "Subscene Model Filtering" and the subscene category with the largest numeric filtering output 128 is selected.

4. Steps 2 to 3 above are repeated until all the regions in the input image 120 are processed.

The technical details for these methods and an example embodiment will be described in the following sections.

C. Patch Feature Extraction

In the method described herein, a patch feature comprises two kinds of features: a color feature and a texture feature. These will be described in detail below. In this invention, features are extracted in the YCbCr domain. Since most of the images are stored in RGB format, typically a format transformation from another format to YCbCr must be performed prior to feature extraction.

Color Feature Extraction

Figure 2:
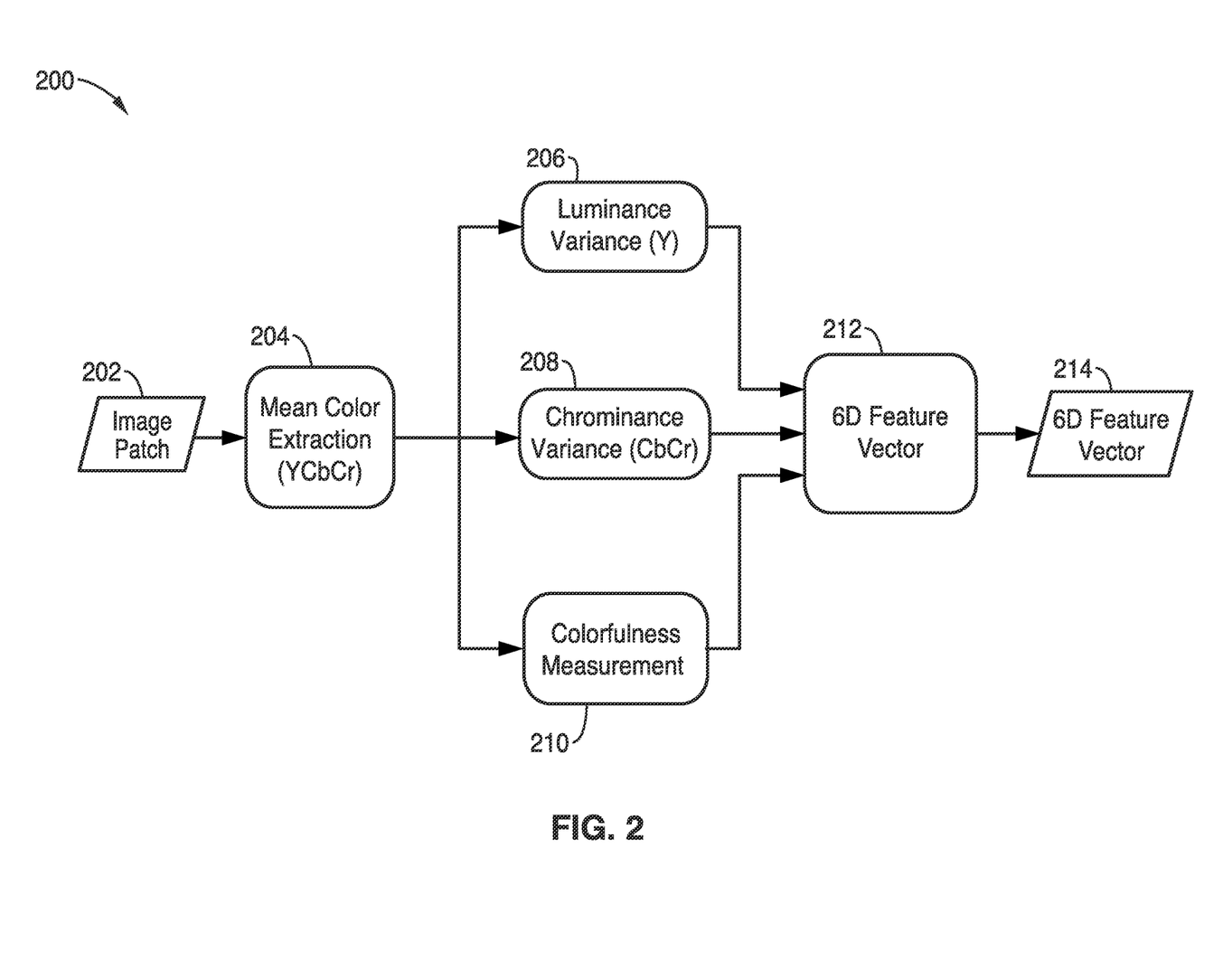
FIG. 2 is a flow chart of an image patch color feature extraction method.

Refer now to FIG. 2, which is a flow chart illustrating the image patch color feature extraction method 200, which is done as follows.

1. Initially, an image patch 202 is input.

2. Mean values of luminance channel (the Y domain) and the blue and red chrominance channels (the CbCr domain) for the image patch 202 are calculated in the module "Mean Color Extraction" 204, yielding respectively the average values $\overline{Y}$, $\overline{Cb}$, and $\overline{Cr}$. The "Mean Color Extraction" 204 may be processed either concurrently (if processed with parallel hardware), or at a different time (using traditional computational methods without substantial parallelism).

3. An image patch luminance variance is calculated in the module "Luminance Variance" 206 as follows:

$$\text{Var}(Y) = \frac{1}{N}\sum_{i=1}^{N}(Y_i - \overline{Y})^2$$

An image patch chrominance variance is calculated in the module "Chrominance Variance" 208 as follows:

$$\text{Var}(CbCr) = \frac{1}{N}\left(\sum_{i=1}^{N}(Cb_i - \overline{Cb})^2 + (Cr_i - \overline{Cr})^2\right)$$

where N denotes the number of pixels in the image patch, $Y_i$, $Cb_i$, and $Cr_i$ denote the pixel value in position i in the image patch in each color channel, $\overline{Y}$ represents the mean value of Y, $\overline{Cb}$ represents the mean value of Cb, and $\overline{Cr}$ represents the mean value of Cr.

4. After $\overline{Cb}$ and $\overline{Cr}$ are obtained, an image patch colorfulness value is calculated as Colorfulness=|$\overline{Cb}$−$\overline{Cr}$| in the "Colorfulness Measurement" module 210.

5. Finally, the above extracted values are combined to form a 6 dimension (6D) color feature vector ($\vec{V}_{color}$):

$$\vec{V}_{color}=(Y,\overline{Cb},\overline{Cr},Var(Y),Var(CbCr),\text{Colorfulness})$$

in the "6D Feature Vector" formation module 212. The resultant output 6D feature vector 214 is the output of the color feature extraction.

Texture Feature Extraction

Figure 3:
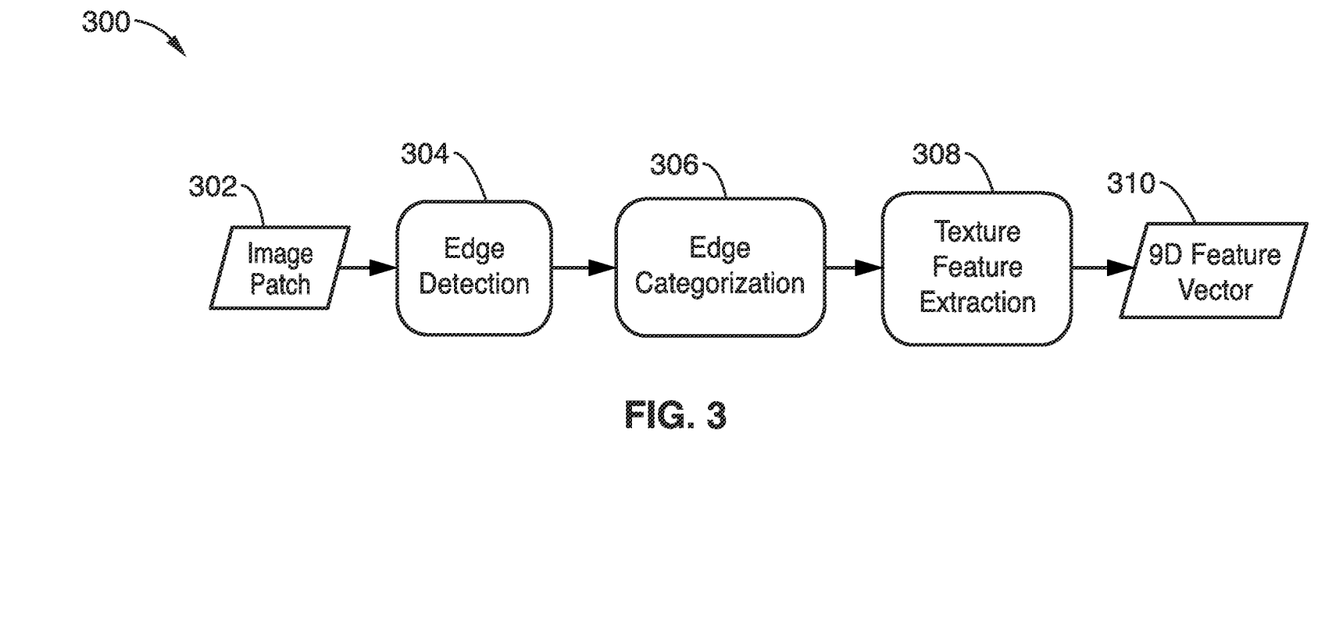
FIG. 3 is a flow chart of an image patch texture feature extraction method.

Refer now to FIG. 3, which is a flowchart illustrating the texture feature extraction method 300. Here, the texture feature is extracted by using the luminance channel as follows:

1. An image patch is input 302 that will have texture feature extraction.

2. An edge detection procedure is applied on the luminance channel (Y domain) in the module "Edge Detection" 304 to extract edge points within the image patch 302. The edge detection procedure may use any prior art edge detection method. In a current embodiment, the Canny edge detection (developed by John F. Canny) scheme is used.

3. After all the edge points are obtained, they are categorized into nine classes according to their gradient directions, which are rounded to integer degrees in module "Edge Categorization" 306. The nine directions are: $D_0$ (−10° to +10°), $D_1$ (11° to 30°), $D_2$ (31° to 50°), $D_3$ (51° to 70°), $D_4$ (71° to 90°), $D_5$ (91° to 110°), $D_6$ (111° to 130°), $D_7$ (131° to 150°), and $D_8$ (151° to 170°).

Depending on the hardware used for processing, the "Edge Categorization" 306 step may be processed in parallel for an improvement in execution speed. Alternatively, they may be processed sequentially.

4. After step 3, the texture feature is calculated as follows in module "Texture Feature Extraction" 308 for each image patch 302:

$$D_U = \sum_{Direction(Edge(i,j))=U} \|Edge(i,j)\|$$

where U is the direction index, $U \in (D_0, D_1, D_2, D_3, D_4, D_5, D_6, D_7, D_8)$ previously defined, (i,j) denotes the point position within the range of the image patch 302 and $\|Edge(i,j)\|$ denotes the edge strength (amplitude of the gradient).

5. After the categorization 306 is performed for all nine directions, a 9D texture feature vector is obtained 310 as follows:

$$\vec{V}_{texture}=(D_0,D_1,D_2,D_3,D_4,D_5,D_6,D_7,D_8)$$

Subscene Patch Feature Formation

After the color feature and texture feature are calculated, they are concatenated sequentially to form a 15 dimensional (15D) image patch feature vector ($\vec{V}_{image\_patch}$) to represent the image patch 302:

$$\vec{V}_{image\_patch}=(\vec{V}_{color}, \vec{V}_{texture})$$

Based on $\vec{V}_{image\_patch}$, a subscene model is then developed.

D. Subscene Modeling Based on Image Patch Features

Through many years of investigation, two approaches have been proposed for general object or scene recognition. One approach is discriminative based, which basically trains classifiers to find decision boundaries in the feature space to separate one class from the others. However, the discrimination approach requires a sufficient amount of training data to achieve a complete description of all others. In reality, the sufficient amount is impossible to achieve. As soon as new data is available, the training must be redone.

The second recognition approach is generative based. This is different from the previously described classifier based approach in that it only models the target class and assumes all other classes have different distributions. After the generative model is learned from the training data, the probability density of a subscene region can be estimated based on the maximum likelihood between the subscene image patch feature and the corresponding generative model.

In this invention, the generative approach is used to develop a multivariable Gaussian mixture based subscene model for subscene representation. By using a feature vector $\vec{X}$ having d dimensionality, a multivariable Gaussian distribution can be described as follows:

$$p_k(\vec{X}) = \frac{1}{(2\pi)^{d/2}\|S_k\|^{1/2}} \exp\left(\frac{1}{2}(\vec{X}-\vec{M}_k)^T [S_k]^{-1} (\vec{X}-\vec{M}_k)\right)$$

A Gaussian mixture can be described as:

$$P(\vec{X}; \vec{M}_k, [S_k], w_k) = \sum_{k=1}^m w_k p_k(\vec{X}), w_k \geq 0, \sum_{k=1}^m w_k = 1$$

where m is the number of mixtures or clusters, $\vec{M}_k$ is the mean vector, $[S_k]$ is the covariance matrix, $\|S_k\|^{1/2}$ is the norm of the covariance matrix, and $w_k$ is the weight of $k^{th}$ cluster. When the training data and the number of clusters m are known, an expectation-maximization (EM) algorithm is used to estimate the parameters of the Gaussian mixture. Therefore, for fixed training data and m clusters, the parameters $\vec{M}_k$, $[S_k]$, and $w_k$ are fixed. Once the training data is fixed, the key to achieve a good Gaussian mixture model is to find a suitable value for the number of clusters, m. Smaller numbers of clusters m usually generate looser models that have very weak discriminative powers. On the other hand, too large a number of clusters m will generate an over-fit model that can only recognize the training data.

Figure 4:
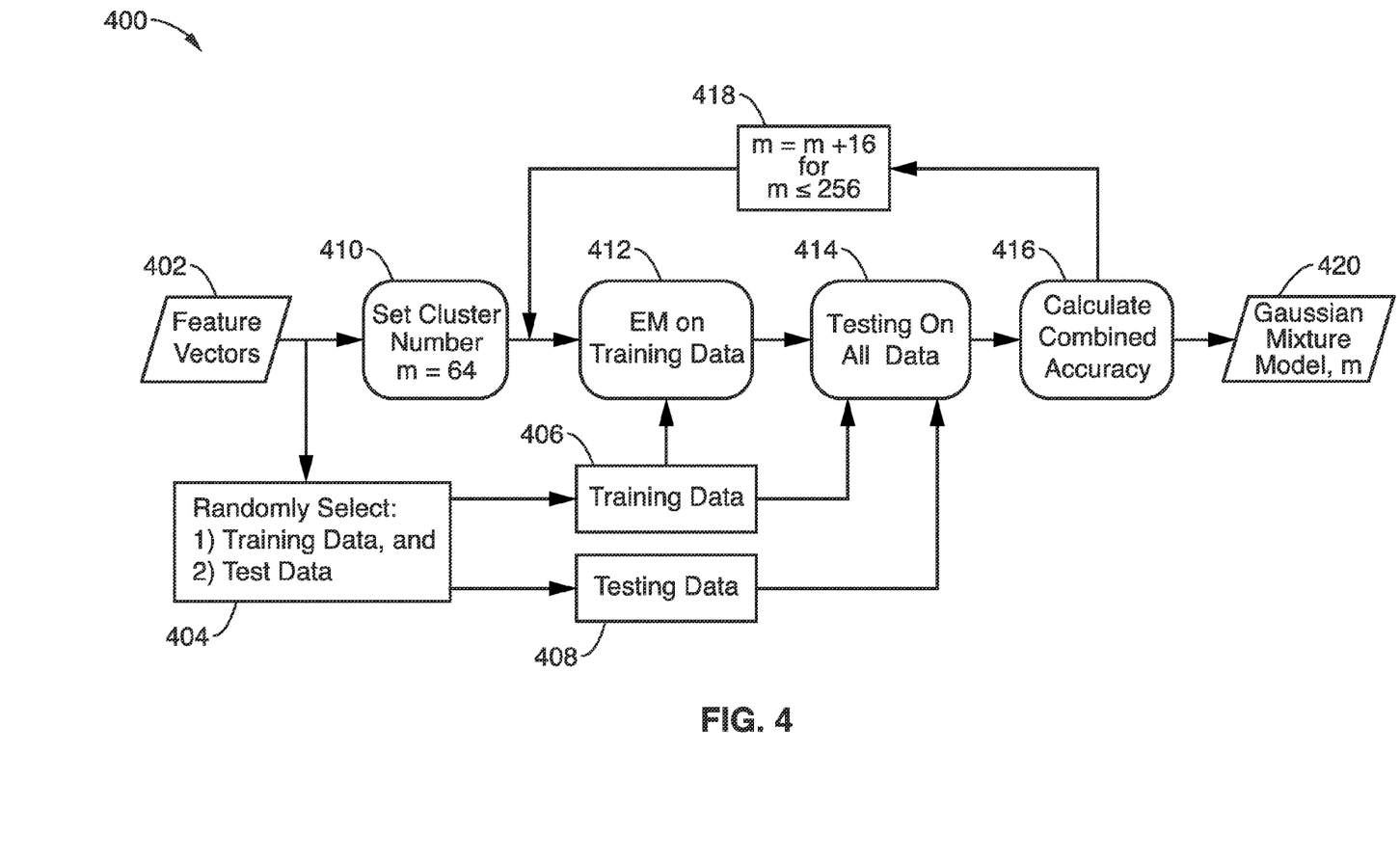
FIG. 4 is a flow chart for determining the optimal number of clusters in the image patch modeling process.

Refer now to FIG. 4, which is a flowchart of the method used to find a suitable number of clusters, m, for subscene modeling 500. Initially, all input feature vectors 402 are randomly divided 404 into training data 406 and testing data 408. The subscene model is then constructed as follows:

1. Initialize a number of clusters equal to a small number index m (where ranges from $24 \leq m \leq 256$ in a current embodiment 410).

2. Apply the expectation-maximization (EM) algorithm 412 with m clusters on the training data 406 to obtain an $m^{th}$ Gaussian mixture model.

3. Test 414: 1) the obtained $m^{th}$ Gaussian mixture model on the training data 406 to obtain a training accuracy rate $Accuracy_{training}$ (m); and 2) the obtained Gaussian mixture model on the testing data 408 to obtain a testing accuracy rate $Accuracy_{testing}$(m). Calculate the combined accuracy rate $Accuracy_{combined}$ (m) 416 as:

$$Accuracy_{combined}(m) = \begin{cases} Accuracy_{training}(m) + \\ Accuracy_{testing}(m) - \\ c_1 * |Accuracy_{training}(m) - Accuracy_{testing}(m)| \end{cases}$$

where $c_1$ is a weighting parameter that ranges from [0-0.5].

4. Increase the number of clusters m by sixteen (m+16) 418 and repeat the above steps 2-3 until the number of clusters m reaches a maximum threshold (which is 256 in a current embodiment).

5. Select and output 420 the model that has the highest combined Accuracy$_{combined}$ (m) rate as:

$$\underset{m}{\operatorname{argmax}}(\text{Accuracy}_{combined}(m))$$

E. Subscene Recognition

By using the patch feature extraction and modeling processes described herein, one can generate a representation model for nearly any subscene category. The subscene can be recognized based on a representation model output corresponding to the subscene patch feature. When a new image is obtained, subscene recognition can be used to annotate each region of the image. By combining all subscene regions in an image, a complete representation of an image may be obtained.

Figure 5:
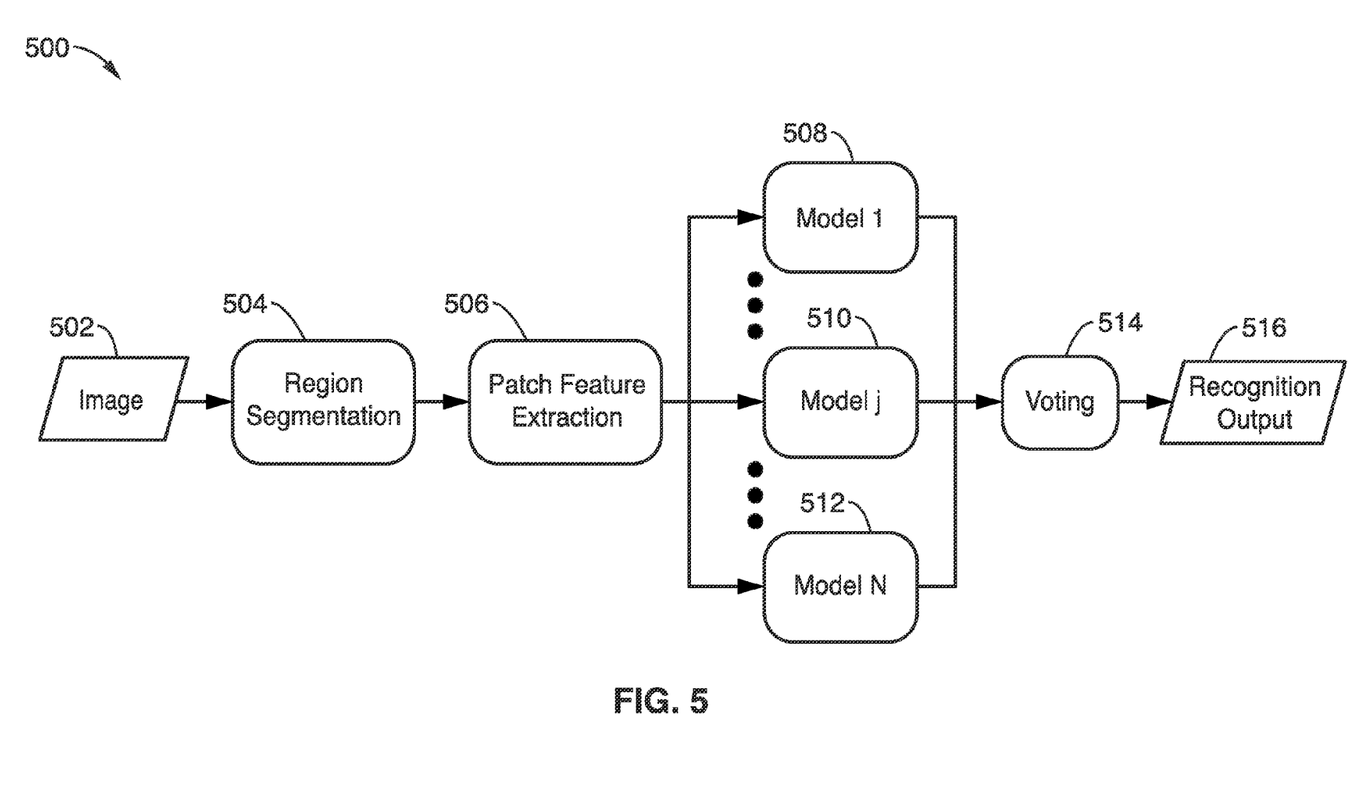
FIG. 5 is a flow chart of the image patch modeling based recognition method.

Refer now to FIG. 5, which is a flowchart of the overall subscene recognition scheme described herein 500. It can be applied as follows:

1. Given an input image 502, segment 504 the input image 502 into a set of regions. Users may choose any good segmentation technique to perform the segmentation.

2. Each region is divided into a set of fixed size image patches. From these patches, patch features including a color feature and a texture feature are extracted in the patch feature extraction module 506.

3. After a patch feature $\vec{X}$ is extracted, it is used as input into different subscene models, from Model 1 508, to Model j 510, to Model N 512 of N models (where $1 \leq j \leq N$). Each model has a corresponding calculated output:

$$O_i = \frac{1}{K}\sum_{j=0}^{K} \text{Output}(j)$$

where i is an index for the model of the specified sub-scene category, j is the index for the image patches, K is the number of image patches in the sub-scene and Output(j) is the image patch filter output which is calculated as:

$$\text{Output}(j) = \frac{1}{1+e^{-CP}}$$

where C is a constant parameter and P is calculated as P=log $C_k$, k is the index for the selected cluster in the Gaussian mixture model, and $C_k$ is the cluster output.

After all the N Model outputs (e.g. 508, 510, 512) are obtained, the model with the maximum output is selected in voting block 514 as the recognition output 516 by the following expression:

$$\underset{i}{\operatorname{argmax}}(O_0, O_1, \ldots, O_k, \ldots, O_N).$$

Figure 6:
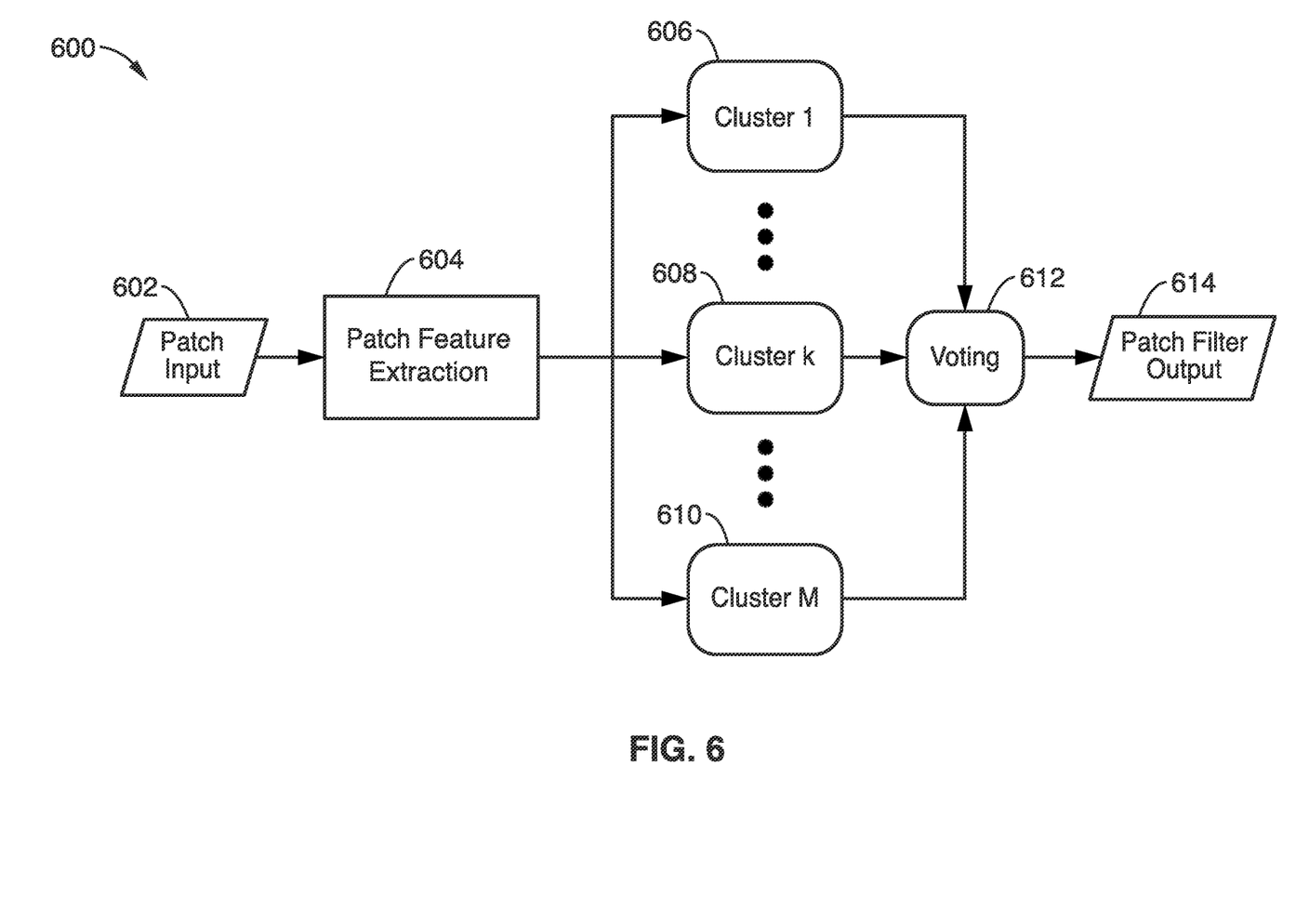
FIG. 6 is a flow chart of the cluster selection process.

Refer now to FIG. 6 for a flow chart 600 depicting the process of cluster selection. First, a patch input 602 is obtained. Then patch feature extraction 604 is done on the patch input 602, which results in M output clusters, ranging from Cluster 1 606, to Cluster k 608, to Cluster M 610. For each Cluster "k" 608 in the model, a respective output is calculated by:

$$C_k = w_k p_k(X_j).$$

After all the Cluster outputs have been obtained, the Cluster with the maximum output is selected in the voting block 612 as the image patch filter output 614 by:

$$\underset{k}{\operatorname{argmax}}(C_0, C_1, \ldots, C_k, \ldots, C_M).$$

The above procedure is continued until all the image patch regions are processed.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation(s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/ or block(s) of the flowchart(s).

From the discussion above it will be appreciated that the invention can be embodied in various ways, including the following:

1. An image classification apparatus, comprising: a computer; and means for patch classifying an input image using the computer.

2. The apparatus of claim 1, wherein the means for patch classifying comprises programming executable on the computer for performing steps comprising: subscene modeling; and subscene recognition.

3. The apparatus of claim 2, wherein said subscene modeling step comprises: segmenting an input image training set from an image database into one or more segmented regions based on an input pool of N subscene categories; extracting a set of training patch feature vectors for each of the segmented regions corresponding to the input pool of N subscene categories; and forming a subscene model pool comprising training patch feature vectors for each for the input pool of N subscene categories.

4. The apparatus of claim 1, wherein the computer is capable of executing the means for patch classifying either sequentially or at least partially in parallel.

5. The apparatus of claim 3, wherein the subscene recognition step comprises: segmenting the input image into a set of input regions; extracting patch features corresponding to each of the set of input regions to form a set of extracted patch feature vectors; and filtering the set of extracted patch features against the subscene model pool to form a filtered output.

6. The apparatus of claim 5, wherein the subscene recognition step further comprises: selecting a set of Gaussian cluster outputs corresponding to one or more of the largest filtered outputs; and selecting a subscene category corresponding to the largest filtered output.

7. The apparatus of claim 5, wherein the programming performs steps further comprising: (a) setting a subscene to one of the group consisting of the training patch feature vectors and the set of extracted patch feature vectors; (b) dividing the subscene into a set of image patches; and (c) describing each image patch by a set of concatenated image patch feature vectors $\vec{V}_{image\_patch}$ comprising: a color feature vector $\vec{V}_{color}$; and a texture feature vector $\vec{V}_{texture}$; (d) wherein the subscene is in a YCbCr color space with a luminance Y channel, a blue chrominance Cb channel, and a red chrominance Cr channel.

8. The apparatus of claim 7, wherein the color feature vector $\vec{V}_{color}$ is calculated for each image patch in the subscene by performing steps comprising: calculating a mean value $\overline{Y}$ of the luminance Y channel and mean values $\overline{Cb}$ and $\overline{Cr}$ respectively for both the blue Cb and red Cr chrominance channels.

9. The apparatus of claim 8, wherein the color feature vector $\vec{V}_{color}$ is calculated for each image patch by performing steps comprising: calculating a patch luminance variance as:

$$\text{Var}(Y) = \frac{1}{N}\sum_{i=1}^{N}(Y_i - \overline{Y})^2;$$

and calculating a patch chrominance variance as:

$$\text{Var}(CbCr) = \frac{1}{N}\left(\sum_{i=1}^{N}(Cb_i - \overline{Cb})^2 + (Cr_i - \overline{Cr})^2\right);$$

wherein N denotes a number of pixels in the image patch, $Y_i$, $Cb_i$, and $Cr_i$ denote a pixel value in position i in the image patch in each of the luminance Y channel, the blue Cb, and the red Cr chrominance channels, $\overline{Y}$ represents the mean value of Y, $\overline{Cb}$ represents the mean value of Cb, and $\overline{Cr}$ represents the mean value of Cr.

10. The apparatus of claim 9, wherein the color feature vector $\vec{V}_{color}$ is calculated for each image patch by performing steps further comprising calculating a colorfulness value as Colorfulness=$|\overline{Cb}-\overline{Cr}|$.

11. The apparatus of claim 10, wherein the color feature vector $\vec{V}_{color}$ is calculated for each image patch by performing steps further comprising forming a 6-dimensional (6D) color feature vector ($\vec{V}_{color}$) as $$\vec{V}_{color}=(\overline{Y},\overline{Cb},\overline{Cr},Var(Y),Var(CbCr),\text{Colorfulness}).$$

12. The apparatus of claim 11, wherein the texture feature vector $\vec{V}_{texture}$ is calculated for each image patch in the subscene by performing steps comprising: performing an edge detection procedure on the luminance channel (Y domain) to generate a set of edge points; and categorizing each edge point into one of nine classes according to their gradient directions, which are rounded to integer degrees into one of nine directions selected from the group of directions consisting of: $D_0$ (−10° to +10°), $D_1$ (11° to 30°), $D_2$ (31° to 50°), $D_3$ (51° to 70°), $D_4$ (71° to 90°), $D_5$ (91° to 110°), $D_6$ (111° to 130°), $D_7$ (131° to 150°), and $D_8$ (151° to 170°).

13. The apparatus of claim 12, wherein the texture feature vector $\vec{V}_{texture}$ is calculated for each image patch in the subscene according to $$D_U = \sum_{Direction(Edge(i,j))=U} \|\text{Edge}(i,j)\|$$

where U is the direction index, $U\epsilon(D_0, D_1, D_2, D_3, D_4, D_5, D_6, D_7, D_8)$, (i,j) denotes the point position within the range of the image patch, and $\|\text{Edge}(i,j)\|$ denotes the edge strength (amplitude of the gradient).

14. The apparatus of claim 13, wherein the texture feature vector $\vec{V}_{texture}$ is calculated by performing steps comprising forming a concatenated 9-dimensional (9D) texture feature vector ($\vec{V}_{texture}$), where $$\vec{V}_{texture}=(D_0,D_1,D_2,D_3,D_4,D_5,D_6,D_7,D_8).$$

15. The apparatus of claim 14, wherein each of the image patch feature vectors $\vec{V}_{image\_patch}$ is calculated by performing steps comprising forming a concatenated 15-dimensional (15D) texture feature vector $\vec{V}_{image\_patch}$, where $\vec{V}_{image\_patch}=(\vec{V}_{color},\vec{V}_{texture})$ and where $\vec{V}_{image\_patch}$ written in detail comprises $$\vec{V}_{image\_patch} = \begin{pmatrix} \overline{Y}, \overline{Cb}, \overline{Cr}, \text{Var}(Y), \text{Var}(CbCr), \text{Colorfulness} \\ D_0, D_1, D_2, D_3, D_4, D_5, D_6, D_7, D_8 \end{pmatrix}.$$

16. The apparatus of claim 3, wherein the subscene modeling step comprises selecting an optimal number of clusters in the step of forming the subscene model pool.

17. The apparatus of claim 1, wherein the means for patch classifying is stored on a computer readable medium.

18. The apparatus of claim 2, wherein the subscene recognition step is performed on a set of photographs.

19. An image classification apparatus, comprising: a computer; and programming executable on the computer for patch classifying an input image by performing steps comprising: subscene recognition; and subscene modeling; wherein the programming performs the subscene modeling step by performing steps comprising: segmenting an input image training set from an image database into one or more segmented regions based on an input pool of N subscene categories; extracting a set of training patch feature vectors for each of the segmented regions corresponding to the input pool of N subscene categories; and forming a subscene model pool comprising training patch feature vectors for each for the input pool of N subscene categories.

20. The apparatus of claim 19, wherein programming is stored on a computer readable medium in either source code or object code.

21. An image classification apparatus, comprising: a computer; and programming executable on the computer for patch classifying an input image by performing steps comprising: subscene modeling; and subscene recognition.

22. A computer readable medium wherein the programming of claim 21 is stored.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An image classification apparatus, comprising:
   a computer; and
   programming executable on the computer for patch classifying an input image by performing steps comprising:
   (a) performing subscene modeling by:
      (i) segmenting an input image training set from an image database into one or more segmented regions based on an input pool of N subscene categories;
      (ii) extracting a set of training patch feature vectors for each of the segmented regions corresponding to the input pool of N subscene categories; and
      (iii) forming a subscene model pool comprising training patch feature vectors for each for the input pool of N subscene categories;
   (b) performing subscene recognition by:
      (i) segmenting the input image into a set of input regions;
      (ii) extracting patch features corresponding to each of the set of input regions to form a set of extracted patch feature vectors; and
      (iii) filtering the set of extracted patch features against the subscene model pool to form a filtered output; and
   (c) setting a subscene to one of the group consisting of the training patch feature vectors and the set of extracted patch feature vectors;
   (d) dividing the subscene into a set of image patches; and
   (e) describing each image patch by a set of concatenated image patch feature vectors $\vec{V}_{image\_patch}$ comprising:
      (i) a color feature vector $\vec{V}_{color}$; and
      (ii) a texture feature vector $\vec{V}_{texture}$;
      (iii) wherein the subscene is in a YCbCr color space with a luminance Y channel, a blue chrominance Cb channel, and a red chrominance Cr channel;
   (f) wherein the color feature vector $\vec{V}_{color}$ is calculated for each image patch in the subscene by performing steps comprising:
      (i) calculating a mean value $\overline{Y}$ of the luminance Y channel and mean values $\overline{Cb}$ and red $\overline{Cr}$ respectively for both the blue Cb and red Cr chrominance channels;
      (ii) calculating a patch luminance variance as:

$$\mathrm{Var}(Y) = \frac{1}{N}\sum_{i=1}^{N}(Y_i - \overline{Y})^2;$$

and
      (iii) calculating a patch chrominance variance as:

$$\mathrm{Var}(CbCr) = \frac{1}{N}\left(\sum_{i=1}^{N}(Cb_i - \overline{Cb})^2 + (Cr_i - \overline{Cr})^2\right);$$

(iv) wherein N denotes a number of pixels in the image patch, $Y_i$, $Cb_i$, and $Cr_i$ denote a pixel value in position i in the image patch in each of the luminance Y channel, the blue Cb, and the red Cr chrominance channels, $\overline{Y}$ represents the mean value of Y, $\overline{Cb}$ represents the mean value of Cb, and $\overline{Cr}$ represents the mean value of Cr.

2. The apparatus of claim 1, wherein the subscene recognition step further comprises:
   selecting a set of Gaussian cluster outputs corresponding to one or more of the largest filtered outputs; and
   selecting a subscene category corresponding to the largest filtered output.

3. The apparatus of claim 1, wherein the color feature vector $\vec{V}_{color}$ is calculated for each image patch by performing steps further comprising calculating a colorfulness value as Colorfulness=$|\overline{Cb}-\overline{Cr}|$.

4. The apparatus of claim 3, wherein the color feature vector $\vec{V}_{color}$ is calculated for each image patch by performing steps further comprising forming a 6-dimensional (6D) color feature vector ($\vec{V}_{color}$) as $$\vec{V}_{color}=(\overline{Y},\overline{Cb},\overline{Cr},\mathrm{Var}(Y),\mathrm{Var}(CbCr),\mathrm{Colorfulness}).$$

5. The apparatus of claim 4, wherein the texture feature vector $\vec{V}_{texture}$ is calculated for each image patch in the subscene by performing steps comprising:
performing an edge detection procedure on the luminance channel (Y domain) to generate a set of edge points; and
categorizing each edge point into one of nine classes according to their gradient directions, which are rounded to integer degrees into one of nine directions selected from the group of directions consisting of: $D_0$ (−10° to +10°), $D_1$ (11° to 30°), $D_2$ (31° to 50°), $D_3$ (51° to 70°), $D_4$ (71° to 90°), $D_5$ (91° to 110°), $D_6$ (111° to 130°), $D_7$ (131° to 150°), and $D_8$ (151° to 170°).

6. The apparatus of claim 5, wherein the texture feature $\vec{V}_{texture}$ is calculated for each image patch in the subscene according to $$D_U = \sum_{Direction(Edge(i,j))=U} \|Edge(i,j)\|$$

where U is the direction index, U∈($D_0, D_1, D_2, D_3, D_4, D_5, D_6, D_7, D_8$), (i,j) denotes the point position within the range of the image patch, and $\|Edge(i,j)\|$ denotes the edge strength (amplitude of the gradient).

7. The apparatus of claim 6, wherein the texture feature vector $\vec{V}_{texture}$ is calculated by performing steps comprising forming a concatenated 9-dimensional (9D) texture feature vector ($\vec{V}_{texture}$), where $\vec{V}_{texture}=(D_0,D_1,D_2,D_3,D_4,D_5,D_6,D_7,D_8)$.

8. The apparatus of claim 7, wherein each of the image patch feature vectors $\vec{V}_{image\_patch}$ is calculated by performing steps comprising forming a concatenated 15-dimensional (15D) texture feature vector $\vec{V}_{image\_patch}$, where $\vec{V}_{image\_patch}=(\vec{V}_{color},\vec{V}_{texture})$ and where $\vec{V}_{image\_patch}$ written in detail comprises $$\vec{V}_{image\_patch} = \begin{pmatrix} \overline{Y}, \overline{Cb}, \overline{Cr}, Var(Y), Var(CbCr), Colorfulness, \\ D_0, D_1, D_2, D_3, D_4, D_5, D_6, D_7, D_8 \end{pmatrix}.$$

9. The apparatus of claim 1, wherein the subscene modeling step comprises selecting an optimal number of clusters in the step of forming the subscene model pool.

10. The apparatus of claim 1, wherein the programming executable for patch classifying is stored on a computer readable medium.

11. The apparatus of claim 1, wherein the subscene recognition step is performed on a set of photographs.

12. A method for image classification, comprising:
providing an input image;
executing, on a computer, programming for patch classifying the input image by performing steps comprising:
(a) performing subscene modeling by:
(i) segmenting an input image training set from an image database into one or more segmented regions based on an input pool of N subscene categories;
(ii) extracting a set of training patch feature vectors for each of the segmented regions corresponding to the input pool of N subscene categories; and
(iii) forming a subscene model pool comprising training patch feature vectors for each for the input pool of N subscene categories;

(b) performing subscene recognition by:
(i) segmenting the input image into a set of input regions;
(ii) extracting patch features corresponding to each of the set of input regions to form a set of extracted patch feature vectors; and
(iii) filtering the set of extracted patch features against the subscene model pool to form a filtered output; and
(c) setting a subscene to one of the group consisting of the training patch feature vectors and the set of extracted patch feature vectors;
(d) dividing the subscene into a set of image patches; and
(e) describing each image patch by a set of concatenated image patch feature vectors $\vec{V}_{image\_patch}$ comprising:
(i) a color feature vector $\vec{V}_{color}$; and
(ii) a texture feature vector $\vec{V}_{texture}$;
(iii) wherein the subscene is in a YCbCr color space with a luminance Y channel, a blue chrominance Cb channel, and a red chrominance Cr channel;
(f) wherein the color feature vector $\vec{V}_{color}$ is calculated for each image patch in the subscene by performing steps comprising:
(i) calculating a mean value $\overline{Y}$ of the luminance Y channel and mean values $\overline{Cb}$ and red $\overline{Cr}$ respectively for both the blue Cb and red Cr chrominance channels;
(ii) calculating a patch luminance variance as:

$$Var(Y) = \frac{1}{N}\sum_{i=1}^{N}(Y_i - \overline{Y})^2;$$

and
(iii) calculating a patch chrominance variance as:

$$Var(CbCr) = \frac{1}{N}\left(\sum_{i=1}^{N}(Cb_i - \overline{Cb})^2 + (Cr_i - \overline{Cr})^2\right);$$

(iv) wherein N denotes a number of pixels in the image patch, $Y_i$, $Cb_i$, and $Cr_i$ denote a pixel value in position i in the image patch in each of the luminance Y channel, the blue Cb, and the red Cr chrominance channels, $\overline{Y}$ represents the mean value of Y, $\overline{Cb}$ represents the mean value of Cb, and $\overline{Cr}$ represents the mean value of Cr.

13. The method of claim 12, wherein the subscene recognition step further comprises:
selecting a set of Gaussian cluster outputs corresponding to one or more of the largest filtered outputs; and
selecting a subscene category corresponding to the largest filtered output.

14. The method of claim 12, wherein the color feature vector $\vec{V}_{color}$ is calculated for each image patch by performing steps further comprising calculating a colorfulness value as Colorfulness=$|\overline{Cb}-\overline{Cr}|$.

15. The method of claim 14, wherein the color feature vector $\vec{V}_{color}$ is calculated for each image patch by performing steps further comprising forming a 6-dimensional (6D) color feature vector ($\vec{V}_{color}$) as $\vec{V}_{color}=(\overline{Y},\overline{Cb},\overline{Cr},Var(Y),Var(CbCr),Colorfulness)$.

16. The method of claim 15, wherein the texture feature vector $\vec{V}_{texture}$ is calculated for each image patch in the subscene by performing steps comprising:
  performing an edge detection procedure on the luminance channel (Y domain) to generate a set of edge points; and
  categorizing each edge point into one of nine classes according to their gradient directions, which are rounded to integer degrees into one of nine directions selected from the group of directions consisting of: $D_0$ (−10° to +10°), $D_1$ (11° to 30°), $D_2$ (31° to 50°), $D_3$ (51° to 70°), $D_4$ (71° to 90°), $D_5$ (91° to 110°), $D_6$ (111° to 130°), $D_7$ (131° to 150°), and $D_8$ (151° to 170°).

17. The method of claim 16, wherein the texture feature vector $\vec{V}_{texture}$ is calculated for each image patch in the subscene according to $$D_U = \sum_{Direction(Edge(i,j))=U} \|Edge(i,j)\|$$

where U is the direction index, $U \in (D_0, D_1, D_2, D_3, D_4, D_5, D_6, D_7, D_8)$, (i,j) denotes the point position within the range of the image patch, and $\|Edge(i,j)\|$ denotes the edge strength (amplitude of the gradient).

18. The method of claim 17, wherein the texture feature vector $\vec{V}_{texture}$ is calculated by performing steps comprising forming a concatenated 9-dimensional (9D) texture feature vector ($\vec{V}_{texture}$), where $\vec{V}_{texture}$=($D_0, D_1, D_2, D_3, D_4, D_5, D_6, D_7, D_8$).

19. The method of claim 18, wherein each of the image patch feature vectors $\vec{V}_{image\_patch}$ is calculated by performing steps comprising forming a concatenated 15-dimensional (15D) texture feature vector $\vec{V}_{image\_patch}$, where $\vec{V}_{image\_patch}$=($\vec{V}_{color}, \vec{V}_{texture}$) and where $\vec{V}_{image\_patch}$ written in detail comprises $$\vec{V}_{image\_patch} = \begin{pmatrix} \overline{Y}, \overline{Cb}, \overline{Cr}, \text{Var}(Y), \text{Var}(CbCr), \text{Colorfulness} \\ D_0, D_1, D_2, D_3, D_4, D_5, D_6, D_7, D_8 \end{pmatrix}.$$

20. The method of claim 12, wherein the subscene modeling step comprises selecting an optimal number of clusters in the step of forming the subscene model pool.

21. The method of claim 12, wherein the programming executable for patch classifying is stored on a computer readable medium.

22. The method of claim 12, wherein the subscene recognition step is performed on a set of photographs.

* * * * *